April 1, 1958  K. C. JENNE  2,828,515
POLE BEARING PLATE
Filed April 15, 1954  2 Sheets-Sheet 1
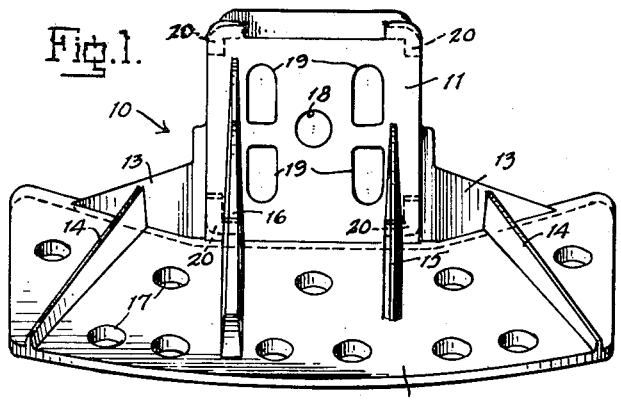
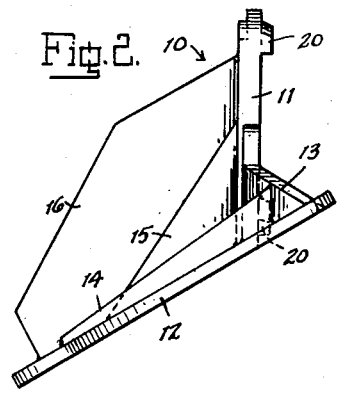
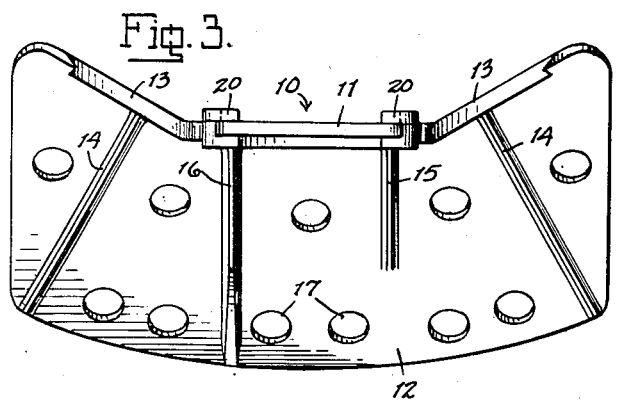
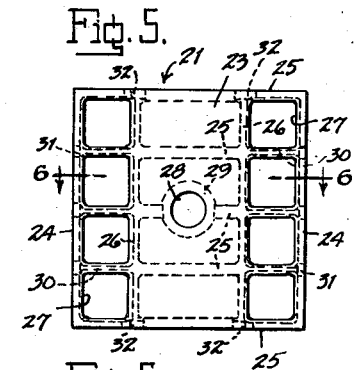
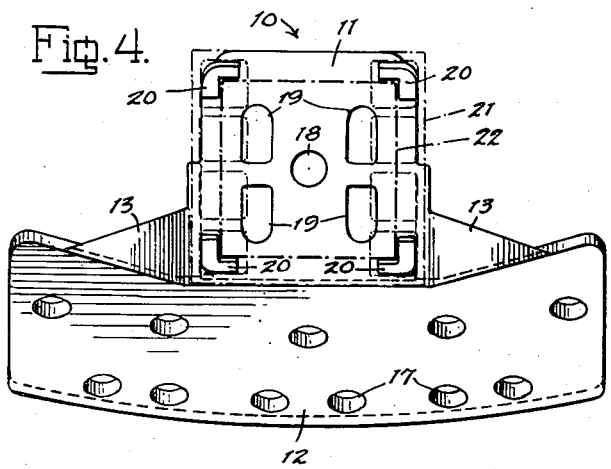
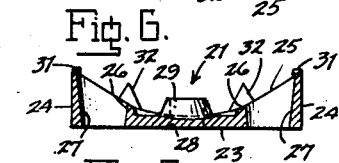
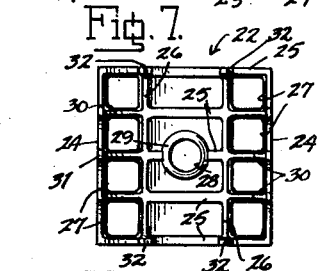
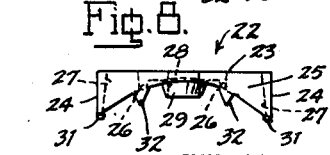
INVENTOR.
KENNETH C. JENNE
BY
ATTORNEY.

April 1, 1958  K. C. JENNE  2,828,515
POLE BEARING PLATE
Filed April 15, 1954  2 Sheets-Sheet 2
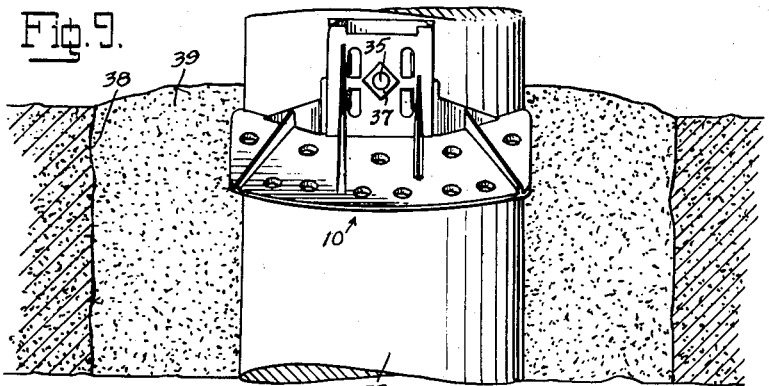
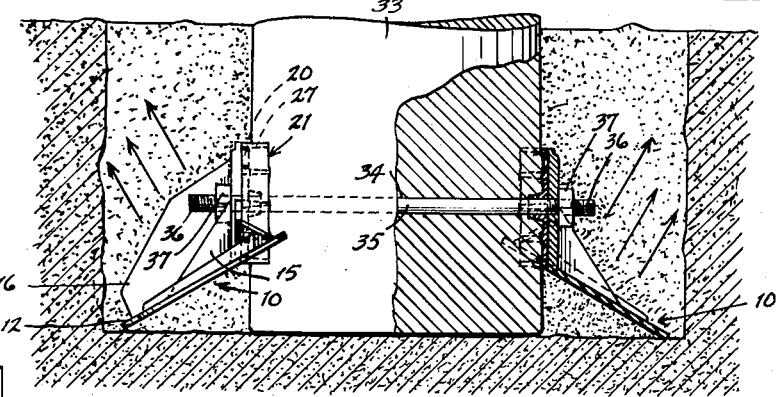
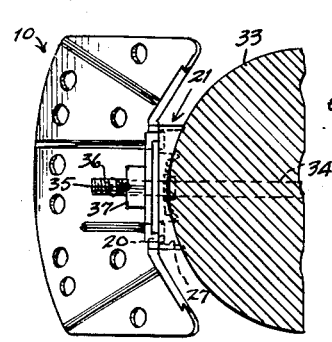
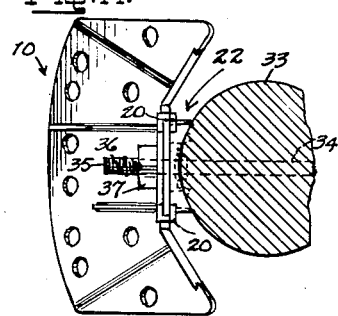
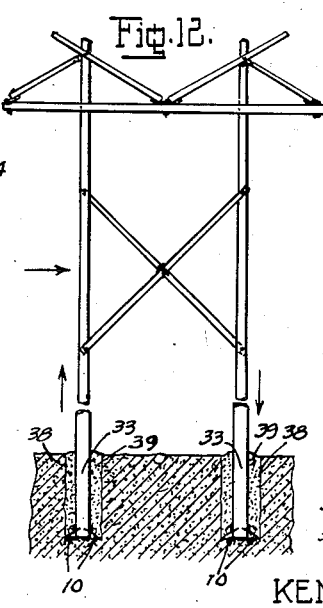
INVENTOR.
KENNETH C. JENNE
BY
ATTORNEY.

United States Patent Office 2,828,515
Patented Apr. 1, 1958

2,828,515

POLE BEARING PLATE

Kenneth C. Jenne, Branford, Conn., assignor to Malleable Iron Fittings Company, Branford, Conn., a corporation of Connecticut Application April 15, 1954, Serial No. 423,501

3 Claims. (Cl. 20—99)

The present invention relates to pole bearing plates, and particularly to such bearing plates for the wood supporting poles of high voltage transmission lines.

Under normal conditions, as well as under icing and high wind conditions, such poles are subjected to various load forces which tend to displace or loosen the pole butt in the ground, such forces being imposed upon the pole butt as uplift, downthrust, and rotational forces. It is an object of the present invention to provide a pole bearing plate adapted to resist such forces to a high degree.

Pole bearing plates have been employed heretofore consisting of laterally projecting horizontally disposed fins or flanges secured by through bolts, lags screws or the like. Uplift and downthrust forces on such fins or flanges are mainly resisted by a shear force exerted upon the through bolts, lag screws or the like, which tends to lossen these securing devices in the wood pole, and under circumstances where the wood pole is often wet, the tendency to loosen is greatly increased, as the resistance to stress of wet wood is relatively low, approximately 60% of that of dry wood.

It is an object of the present invention to provide a bearing plate and a cooperative pole-engaging gain interposed between the plate and the pole, the plate and the gain being connected to the pole by a through bolt, and which gain is adapted to transfer loads imposed upon the plate to a relatively large area of the wood pole rather than through the projected area of the bolt hole alone, to the end that the shear value of the connection is greatly increased, while at the same time shear upon the bolt is minimized, the only appreciable load thereon being in tension. Thus, under normal circumstances, as well as under wet conditions, the resistance to loosening is greatly increased. A further object is to provide a bearing plate which may be secured to the polt butt with its outer edge in substantial line with the base of the pole and with the through bolt at a substantial distance above the base of the pole, thus greatly reducing the possibility of splits developing between the through bolt and the pole base.

In placing a wood pole in the ground, a relatively large, substantially cylindrical hole is usually cut in the ground by an auger or the like, and thereafter the pole butt is placed in the hole and the earth is replaced about the pole and tamped. Thus, the earth surrounding the pole is of two characteristics, i. e., the undisturbed earth outwardly of the wall of the hole and the replaced earth within the hole, which latter naturally has a relatively lowered resistance to dislodgement from the hole.

It is another object of the present invention to provide a bearing plate so arranged that uplift forces on the pole are resolved into forces directed in an angular relation to the wall of the hole consisting of undisturbed earth, so that the pole butt and the bearing plates become, in effect, a cone anchor within the hole to effectually resist uplift forces.

A further object is to provide a pole bearing plate and assembly structure of relatively simple construction, which may be readily attached to the pole either in pre-drilled holes or, in the case of poles already installed, conveniently attached to the pole substantially at grade level so that in the case of a pole becoming downwardly displaced through downthrust forces thereon, the bearing plates can be installed for the purpose of arresting further downward displacement without removal of the pole and with a minimum of cost and effort.

A still further object is to provide a bearing plate having means for the non-rotatable attachment thereto of different sized gains.

Other objects and advantages of the invention will become apparent from a consideration of the following detailed description taken in connection with the accompanying drawings wherein satisfactory embodiments of the invention are shown. However, it is to be understood that the invention is not limited to the details disclosed but includes all such variations and modifications as fall within the spirit of the invention and the scope of the appended claims.

In the drawings:

Fig. 1 is a front elevation of a pole bearing plate according to the illustrated exemplary embodiment of the invention;

Fig. 2 is a side elevation;

Fig. 3 is a top plan view;

Fig. 4 is a rear elevation, the light dot-and-dash lines indicating the relative position of a large size gain thereon, and the heavy dot-and-dash lines indicating the relative position of a smaller size gain thereon;

Fig. 5 is a front elevation of a gain adapted for cooperative use with the bearing plate as illustrated in Figs. 1-4;

Fig. 6 is a transverse sectional view taken along the line 6—6 of Fig. 5;

Fig. 7 is a rear elevation of a gain, similar to that shown in Figs. 5 and 6, but of smaller size, and also adapted for cooperative use with the bearing plate illustrated in Figs. 1-4;

Fig. 8 is a top end view of the gain as seen in Fig. 7;

Fig. 9 is a vertical sectional view, partly broken away, showing the butt end of a pole engaged in the ground and provided with bearing plates according to the invention;

Fig. 10 is a top plan view showing a bearing plate secured to a pole and having a gain similar to that shown in Figs. 5 and 6 connected thereto;

Fig. 11 is a similar view showing a bearing plate secured to a pole of smaller diameter, and having a smaller size gain similar to that shown in Figs. 7 and 8 connected thereto;

Fig. 12 is a front elevation of an H-frame pole support provided with bearing plates according to the invention; and Fig. 13 is a side elevation of a single dead-end pole support provided with bearing plates according to the invention.

Referring to the drawings, and particularly to Figs. 1-4 thereof, the bearing plate illustrated therein and indicated generally as 10 is in the form of a one-piece metal structure, preferably a malleable iron casting, and comprises a substantially square vertically disposed attaching portion 11 and a bearing wing portion 12 extending downwardly and outwardly from the lower edge of the portion 11 and having its ends extended a substantial distance beyond each side edge of the portion 11. The rearward edges of the wing portion at each side of the portion 11 are swept back so that when viewed in plan, as seen in Fig. 3, the rearward side of the portion 11 and the swept-back edges roughly conform to the circumference of the pole. Bracing strut portions 13 extend between the side edges of the portion 11 and the rearward edges of the wing portion 12 at each side of the portion 11, and bracing ribs 14 extend along the upper surface of the wing portion 12 from the forward sides of the strut portions 13 to the forward edge of the wing portion, these ribs being arranged so that they are substantially radial to the pole to which the plate is to be attached.

The intermediate section of the wing portion 12 is provided with a web portion 15 of substantially triangular shape extending between the forward side of the attaching portion 11 near one vertical edge thereof and the upper surface of the wing portion 12. Near the opposite vertical edge of the attaching portion there is provided a web portion 16 of substantially larger area than the web portion 15, and also extending between the forward surface of the attaching portion 11 to the upper surface of the wing portion 12. These web portions provide a substantial bracing between the attaching portion 11 and the wing portion 12, designed to resist both uplift and downthrust forces applied to the wing portion without danger of breakage at the point of connection with the attaching portion 11, and also are of sufficient size to present substantially large upright areas to resist rotational forces upon the plate, as will hereinafter more fully appear. In this connection it is pointed out that the smaller size of the web portion 15 exposes a substantial area of the web portion 16, as seen for instance in Fig. 2, so that both upright surfaces of the two web portions are effective in resisting such strain, whereas if the two web portions were of the same size, one would, in effect, partially neutralize the other in resisting strain.

Openings 17 are preferably provided in the wing portion 12 at suitably spaced points between the rib and web structures. These openings not only reduce the weight without lost of strength but increase the resistance to uplift and downthrust forces upon the wing portion, due to the fact that the earth against which the wing portion presses moves into these openings as anchoring plugs which tends to prevent the sidewise slippage of the earth in parallel relation to the upper and lower surfaces of the wing portion. This would be particularly apt to occur in damp ground.

Substantially centrally of the attaching portion 11 there is provided a bolt receiving hole 18 and in spaced relation about the hole 18 there are preferably provided openings 19 for the purpose of reducing weight. The inner surface of the attaching portion 11 is of generally flat form and is provided at its four corner points with right-angular or L-shaped rearwardly projecting lugs 20 which are adapted to engage with the cooperative gain, presently to be described, for the purpose of preventing relative turning movement of the bearing plate with respect to the gain.

The gains as illustrated in Figs. 5-8 are substantially similar to the gain disclosed in my co-pending patent application for Washer Gains and Joint Assemblies for Timber Structures Formed of Round Wood Poles, Ser. No. 282,618 filed April 16, 1952. These gains are furnished in various sizes to substantially fit round wood poles of varying diameters, the larger gain, as shown in Figs. 5 and 6, being adapted to fit round wood poles of a given range of sizes, while the smaller gain is adapted to fit a range of smaller sized poles. The larger gain is indicated generally as 21, and the smaller gain is indicated generally as 22. However, both gains are of identical form, except for size, so that a detailed description of one will suffice for the other.

The gain is of generally square form and is provided with a flat forward or outer face 23 and an inner face which is concavely formed to substantially embrace the convexly curved surface of a pole. To this end the gain is provided with longitudinal side walls 24—24 between which extend a series of spaced ribs 25, the end ribs of which constitute the end walls of the gain. The edges of these ribs are shaped by forming their intermediate portions on a radius corresponding to the radius of the minimum diameter pole within a given range of sizes, and extending the end portions of the edges in straight lines tangential to the curved intermediate portion so that increasing diameter poles will contact these end portions between their ends and the curved intermediate portion. A pair of longitudinal ribs 26 extend across the ribs 25 to form a grid-like structure with the upper edges of the ribs 26 flush with the upper edges of the ribs 25. Adjacent the side walls 12 the spaces between the ribs are open, as at 27, primarily for the purpose of reducing weight, while the intermediate spaces are solid for added strength. The resultant structure is such that at each corner of the gain there is provided a substantially square opening, and in the present relationship, these square openings of the larger size gain 21 are utilized for non-rotatably connecting the gain to the bearing plate, as will presently more fully appear.

A central bolt receiving hole 28 extends through the gain with its axis normal to the flat outer face 23 and at its inner side is carried through an annulus 29 having an outer conical surface which, as shown in Fig. 6, projects to a considerable extent from the concavely curved surfaces of the ribs 25. The walls of the holes 27 diverge toward the inner side of the gain, so that the inner edges 30 of the ribs are of reduced thickness, thus enabling them to more effectually dig into the wood structure of the pole with a wedging action. In line with the ribs 25 the inner edges of the walls 24 are provided with projecting lugs 31 which enable the edges of these end walls to penetrate into the wood surface.

Upon each of the end ribs 25 constituting the end walls of the gain, there is provided a pair of spurs 32 which serve to dig into the wood pole at points substantially widely spaced both longitudinally and laterally from the central bolt receiving hole 28, and thus firmly fix the position of the gain upon the pole and resist turning of the gain upon the bolt. These spurs provide a positive anchoring of the gain upon the pole over a relatively large area of the pole, which is increased as the gain presses into the pole. However, the stresses that are imposed upon the gain are not entirely concentrated upon the spurs but are distributed through the additional digging engagement of the grid-like ribs 25 and 26 and the lugs 31 into the pole.

As shown in Figs. 9 and 10, gains 21 of the larger size illustrated in Figs. 5 and 6 are associated with the bearing plates illustrated. The butt portion of the pole 33 is provided near its end with a diametrically extending bolt receiving hole 34 in which is engaged a through bolt 35 provided upon each of its ends with screw threads 36 and tightening nuts 37. A bearing plate is secured upon each end of the bolt so that in the illustrated installation the butt end of the pole is provided at diametrically opposed sides with bearing plates. It is pointed out in this connection that, if desired, additional bearing plates may be provided at different heights upon the pole butt, either in vertical line with each other or angularly offset. Also, as shown in Fig. 9, bearing plates may be secured substantially at the ground level, and these may be conveniently attached after the pole is installed. For convenience of illustration, the plates at the ground level are shown at right angles to the plates at the lower end of the pole, but it will be understood that they may be in vertical line therewith if desired. Also, it is pointed out that a single bearing plate may be secured by a through bolt, in which case a washer is provided at the opposite side of the pole. This arrangement may be employed in the case where it is desired to provide three bearing plates equally spaced about the pole.

In installing the bearing plate, the gain 21 has its flat forward surface 23 engaged with the flat rearward surface of the attaching portion 11 of the plate, with the bolt hole 28 in register with the bolt hole 18 and with the lugs 20 engaged in the corner openings 27 of the gain, as shown by the light dot-and-dash lines in Fig. 4. In this relation, relative rotation between the plate and the gain is prevented. In the case of the smaller gain 22, as shown in Fig. 11 and by the heavy dot-and-dash lines in Fig. 4, the corners of the gain fit in the inside right angle corners of the lugs 20 and the gain and plate are thus held against relative turning.

The gain and plate are engaged upon the threaded end of the bolt with the inner side of the gain in engagement with the pole, and by tightening the nut 37 the conical annulus 29 is drawn into the bolt hole 34 and the rib edges, lugs, and spurs are pressed into embedding relation with the pole. Shear stresses upon the bearing plate will thus be distributed to a relatively wide area of the pole without appreciable imposition of such shear stresses upon the bolt or the projected area of the bolt hole.

The hole 38, which is dug into the ground to receive the pole butt, is substantially cylindrical in shape and is of a size to clear the outer edges of the bearing plates which, being convexly curved, will roughly conform to the cylindrical surface. The hole is usually from 6' to 10' deep. The wall of the hole consists of and is backed up by undisturbed earth and when the pole is in place and the hole is filled up about the pole by replacing and tamping the removed earth 39, such wall of undisturbed earth constitutes, in effect, a relatively solid walled container for the pole butt and the tamped filling earth 39, the cylindrical side wall of which is substantially parallel to the substantially centered pole.

The inclined angular disposition of the bearing plates is such that uplift forces on the pole are resisted along lines of force extending substantially at right angles to the inclined surfaces of the wing portions, as indicated by the arrows, and which lines of force are directed in inclined direction with respect to the solid surface of the pole and to the surface of the hole which, being undisturbed earth, provides a substantially solid wall toward which such forces are directed. Thus, in effect, the earth 39 within the hole 38 and the pole butt are, through the medium of the bearing plates, transformed into a cone anchor or wedge within the hole 38, which thus effectually resists uplift forces, the resistance being of an increasing order with an increase in such forces. In the case of downthrust forces, the area of the base of the pole butt, which is engaged with the undisturbed earth at the bottom of the hole, is added to the effective area of the bearing plates, which also engage at their outer edges with the bottom of the hole, thus effectually resisting downthrust.

The engagement of the lugs 20 with the gain prevents rotation of the bearing plate on the gain about the through bolt, and the gain is in turn held against rotation about the through bolt through the embedding engagement of its concave inner side with a convex surface of the pole. Thus, the bearing plate is held in a substantially rigid relation with the pole and is prevented from turning upon the through bolt in the event that the bearing wing encounters a large stone or other solid object on one side while the other side is in soft ground. If, under these conditions, the plate was permitted to rotate it would assume a position in the ground which would be ineffective to resist uplift and downthrust forces. Also the engagement of the lugs with the gain, either within the openings 27 in the case of the large gain, or exteriorly of the corners in the case of the small gain, takes shear load off of the bolt and transfers it to the relatively large area of the wood pole contacted by the gain. Rotational forces upon the pole are effectually resisted by the web 16 as well as by the web 15 and the ribs 14.

In Fig. 12 there is shown a typical H-frame pole structure provided with bearing plates according to the invention. Wind pressure is indicated by the horizontal arrow and downthrust and uplift forces are indicated by the vertical arrows, from which it will be seen that as one pole is forced downwardly the other pole is forced upwardly as a result of the bracing between the poles.

In Fig. 13 there is shown a dead-end pole provided with bearing plates according to the invention and guyed to resist the pull of the transmission lines connected to the pole. In this case the load on the guy, for example 14,000 pounds, causes a downthrust load on the pole, of for example 10,000 pounds. In this type of installation, the pole may be forced downwardly in the ground to a considerable extent beyond its initially set position, and in this case additional bearing plates may be installed at ground level to stabilize the loaded position of the pole.

What is claimed is:

1. A bearing attachment for the ground submerged butt end of a transmission line pole or the like, comprising, in combination, a bearing member including an attaching portion having a through bolt receiving hole substantially centrally thereof and a substantially flat vertical liner surface, a bearing wing part extending outwardly from said attaching part at a downwardly inclined angle, and a gain member having a through bolt receiving hole register with said hole of said attaching portion, said gain member having a flat vertical surface at one side engaged with said flat surface of said attaching portion, a cylindrically curved concave pole engaging surface at its other side, and interengaging locking means carried by said attaching portion and said gain member arranged to prevent turning movement between said bearing member and said gain member relative to a through bolt engaged through said holes.

2. The invention as defined in claim 1, further characterized in that said interengaging locking means comprises an opening in said gain member spaced from said bolt receiving hole thereof, and lug means on said attaching portion engaged in said opening.

3. The invention as defined in claim 1, further characterized in that said interengaging means comprises a right angle outside corner on said gain member and lug means on said attaching portion having a right angle inside wall engaged about said outside corner.

References Cited in the file of this patent

UNITED STATES PATENTS

| 466,315 | Babcock | Jan. 5, 1892 |

FOREIGN PATENTS

| 2,373 | Great Britain | Feb. 2, 1895 |
| 182,118 | Great Britain | Dec. 7, 1922 |
| 356,799 | Great Britain | Sept. 14, 1931 |